Patented May 25, 1926.

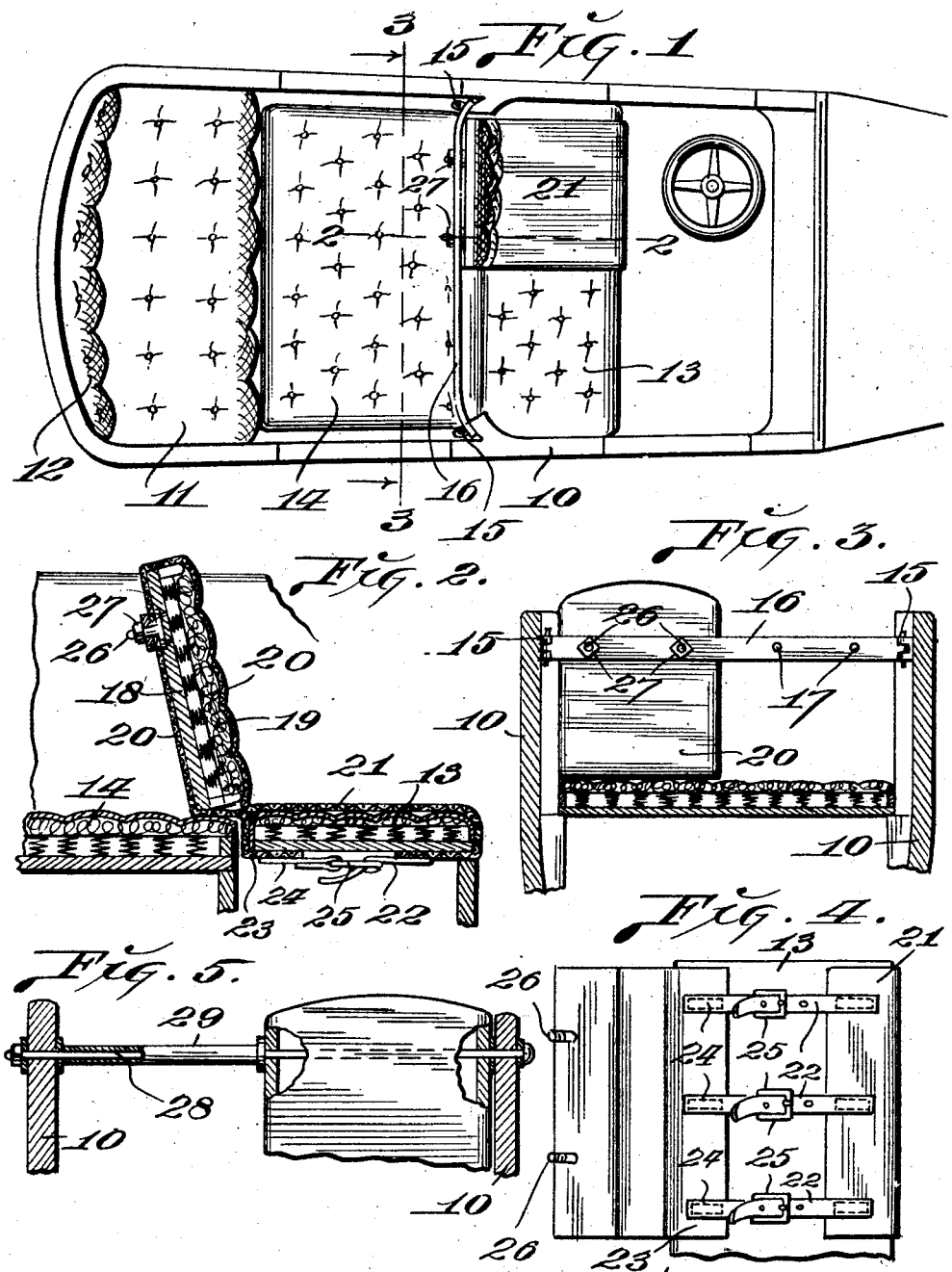

1,586,483

UNITED STATES PATENT OFFICE.

EMANUEL A. SPEEGLE, OF LOS ANGELES, CALIFORNIA.

AUXILIARY SEAT BACK FOR AUTOMOBILES.

Application filed August 13, 1925. Serial No. 50,026.

My invention relates generally to automobiles and more particularly to an auxiliary seat back that is adapted to be utilized in the convertible seat bed type of vehicles and particularly the convertible seat bed structures wherein the seat back of the front seat is formed so as to be swung from a substantially upright position downwardly into a horizontal position to combine with the front and rear seat cushions in forming a bed.

The principal objects of my invention are to provide an auxiliary seat back that may be combined with the front seat cushion while the hinged front seat back is swung downwardly into horizontal position, thereby enabling one person to occupy the front seat and drive the car while another person reclines on the bed structure.

Further objects of my invention are to provide an auxiliary seat bask that is of strong and substantial structure, capable of being easily and cheaply produced and which may be easily and quickly placed in position for use and likewise easily and quickly removed and packed for storage or transportation.

With the foregoing and other objects in view, my invention consists in certain novel features of construction and arrangement of parts that will hereinafter be more fully described and claimed and illustrated in the accompanying drawing, in which—

Fig. 1 is a top plan view of an automobile body and showing the same equipped with an auxiliary seat back of my improved construction.

Fig. 2 is an enlarged vertical section taken approximately on the line 2—2 of Fig. 1.

Fig. 3 is a cross section taken approximately on the line 3—3 of Fig. 1.

Fig. 4 is a view looking against the underside of my improved auxiliary seat back.

Fig. 5 is a cross sectional view showing a modified form of support for the auxiliary seat back.

Referring by numerals to the accompanying drawing which illustrates a practical embodiment of my invention, 10, 10 designate the side walls of an automobile body, 11 the rear seat cushion, 12 the rear seat back, 13 the front seat cushion and 14 the front seat back, which latter is of the conventional "cut back" variety, that is, its lower portion is hinged or pivoted so that said back may be swung from a substantially upward position rearwardly and downwardly into a horizontal position to combine with the front and rear seat cushions in forming a bed bottom. This hinged or pivoted front seat back is firmly secured in its upright position by suitable means arranged at the ends of the seat back structure and which means usually takes the form of toggle links or latching devices 15 and which latter are of standard form and are readily obtainable in the open market.

As a means for supporting the auxiliary seat back contemplated by my invention, I make use of a practically straight bar or strap 16, preferably of metal, and the ends of which are formed so as to be engaged by the toggle members or fastening means 15 that are secured to the body of the vehicle adjacent to the sides thereof and formed in said strap or bar and located at predetermined points are apertures 17. The auxiliary seat back contemplated by my invention comprises a back panel or frame 18 which may be of wood or metal and arranged on the front thereof is a suitable cushion 19 which may consist of a pad or pads, or in some instances, small springs such as are usually employed in the construction of cushions may be utilized. This seat back is made approximately half the width of the front seat of the vehicle and thus two of the seat backs may be used on the front seat when the front seat back is swung downward into a horizontal position. The auxiliary seat back is covered front and rear with sections 20 of fabric, preferably material such as canvas, heavy denim, or the like. That portion of the covering material 20 that overlies the front of the auxiliary seat back is extended a sufficient distance to provide a covering member 21 for that portion of the front seat cushion 13 to which the auxiliary back is applied and this extended portion is of sufficient length to extend downwardly over the front edge of the front seat cushion 13 and thence rearwardly a short distance beneath said front seat cushion.

Secured in any suitable manner to the terminal portion of this extension 21 is a series of straps 22 in which are formed apertures. The lower portion of the covering member 20 that overlies the rear side of the auxiliary seat back 19 is extended below the lower edge of said seat back and thence downwardly to form a flap 23 that is adapted to overlie the rear side of front seat cushion 13 and to extend a short distance beneath the rear portion of said front seat cushion. Secured to this portion 23 is a series of short straps 24, the free ends of which carry buckles 25 and the latter are adapted to receive the ends of the corresponding straps 22. Thus the extended portions 21 and 23 of the auxiliary seat back covering extends over the top end of the front and rear portions of the seat cushion and when the ends of strap 22 are secured to buckles 25 the auxiliary back is firmly secured to the front seat cushion.

To firmly retain the auxiliary seat back in upright position, the projecting threaded ends of studs 26 that are seated in back panel or frame 18 project through the corresponding apertures 17 in strap 16 and the projecting portions of said studs receive nuts 27. Inasmuch as the ends of bar 16 are firmly secured to toggle members 15, said bar provides a firm and substantial support for the upper portion of the auxiliary seat back.

Bar 16 occupies a position a substantial distance above the horizontal plane occupied by the cushions 11 and 13 and the back 14 when the latter is swung downward and thus a person lying on the bed bottom formed by the horizontal cushions has ample room for the feet or head beneath said bar 16.

In the event that it is desired to provide a bed or resting place for one or two small children, the front seat back 14 may be swung downward into a horizontal plane to combine with the rear seat cushion 11 in forming a bed bottom, and by placing two of the auxiliary seat backs on the front seat cushion 13 and the supporting bar 16, two adults may occupy the front seat in comfort.

In some "cut back" front seat arrangements the seat back is retained in normal upright position by means of a rod such as 28 that passes through the upper portion of the seat back and through suitably located apertures in side walls 10 of the vehicle body and where such a support is used the rod 28 may extend through the upper portion of the auxiliary seat back frame as illustrated in Fig. 5, and a tube section or elongated ferrule such as 29 may be arranged between the auxiliary seat back frame and the side of the car body.

The auxiliary seat back herein disclosed is particularly adapted for use in connection with the convertible seat bed for motor vehicles that forms the subject matter of my copending application for United States Letters Patent filed September 18, 1924, Serial No. 738,423.

Thus it will be seen that I have provided a simple, convenient and practical seat back for automobiles and particularly those having convertible seat back arrangements where the front seat back swings rearwardly and downwardly into a horizontal plane.

While I have shown and described a preferred embodiment of my improved auxiliary seat back, it will be understood that the construction of said seat back may be varied in size, form and construction without departing from the spirit of my invention, the scope of which is set forth in the appended claims.

I claim as my invention:

1. The combination with a motor vehicle having a front seat back that is adapted to be swung from its normal upright position downwardly and rearwardly into a horizontal position, of a supporting rail arranged transversely within the vehicle body above the rear portion of the front seat cushion, means for detachably connecting the ends of said supporting rail to the side walls of the vehicle body, an auxiliary seat back detachably connected to said supporting member and flexible members projecting from the lower portion of said auxiliary seat back, which flexible members pass partially around the adjacent front seat cushion.

2. The combination with a motor vehicle having a front seat back that is adapted to be swung from its normal upright position downwardly and rearwardly into a horizontal position, of a supporting rail arranged transversely within the vehicle body above the rear portion of the front seat cushion, means for detachably connecting the ends of said supporting rail to the side walls of the vehicle body, an auxiliary seat back detachably connected to said supporting member, flexible members projecting from the lower portion of said auxiliary seat back, which flexible members pass partially around the adjacent front seat cushion and means on said flexible members for securing the same in position on said front seat cushion.

3. The combination with a motor vehicle having a front seat back that is adapted to be swung from its normal upright position downwardly and rearwardly into a horizontal position, of a supporting rail arranged transversely within the vehicle body above the rear portion of the front seat cushion, said rail being provided with apertures, an auxiliary seat back adapted to be positioned against said supporting rail, studs on said seat back, which studs pass through the apertures in the transversely disposed rail and flexible members projecting from the lower portion of said auxiliary seat back and which flexible members extend partially around the adjacent front seat cushion.

4. The combination with a motor vehicle having a front seat back that is adapted to be swung from its normal upright position downwardly and rearwardly into a horizontal position, of a supporting rail arranged transversely within the vehicle body above the rear portion of the front seat cushion, said rail being provided with apertures, an auxiliary seat back adapted to be positioned against said supporting rail, studs on said seat back, which studs pass through the apertures in the transversely disposed rail, flexible members projecting from the lower portion of said auxiliary seat back and which flexible members extend partially around the adjacent front seat cushion and means on said flexible members for securing the same in position on said front seat cushion.

In testimony whereof I affix my signature.

EMANUEL A. SPEEGLE.